United States Patent Office 3,457,732
Patented July 29, 1969

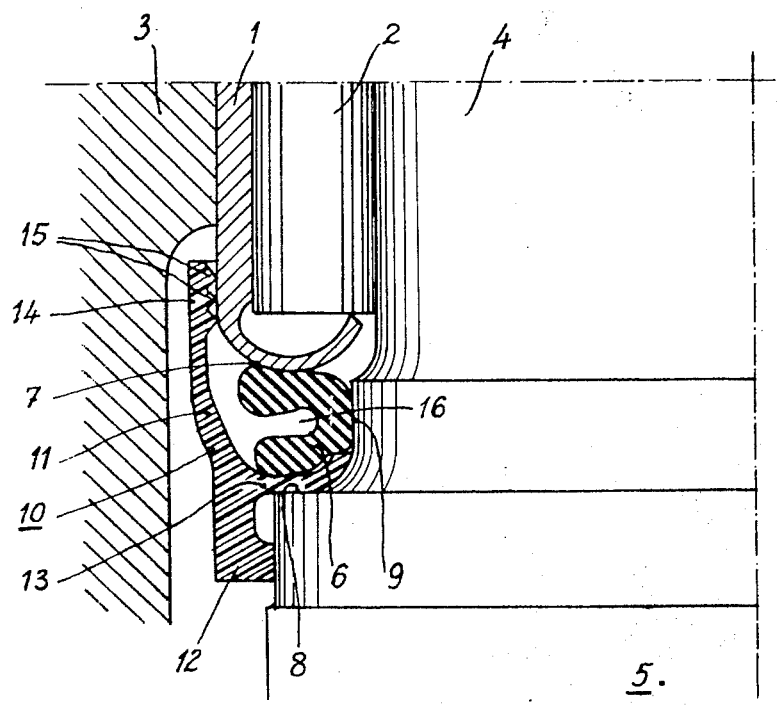

3,457,732
PROTECTION RINGS FOR UNIVERSAL JOINT PACKINGS
Georges Decouzon, Billancourt, France, assignor to Regie Nationale des Usines Renault, Billancourt, Hauts-de-Seine, France, a French corporation
Filed Mar. 27, 1967, Ser. No. 626,058
Claims priority, application France, Apr. 8, 1966, 57,160
Int. Cl. F16d 3/26; F16j 15/04
U.S. Cl. 64—17                    2 Claims

ABSTRACT OF THE DISCLOSURE

Protection ring for protecting a shaft seal or packing fitted on a pin of a universal joint cross-pin member, between a shoulder of the corresponding pin and a bearing socket of said pin, said ring being characterized in that it consists of a tubular portion mounted on the relevant pin and on the external lateral wall of said bearing socket, and of an annular portion having its inner edge inserted between said shoulder and the packing of said cross-pin member.

---

The present invention relates to protection rings for sealing packings of needle-bearing sockets or the like, notably those provided for trunnioning the cross-pins of a universal joint therein.

It is known that the fluid-tightness of these needle-bearing sockets, packed with a suitable lubricant, is obtained as a rule by interposing a flexible seal or packing between the edge of the socket and a shoulder formed on the corresponding pin of the cross-pin member, said seal or packing being in sealing engagement with said pin. However, in certain cases this single sealing packing may prove inadequate for preventing the ingress of foreign matters, notably wash water when the latter is directed in the form of a powerful jet against this packing when washing an automotive vehicle equipped with universal joints in a service station.

It is the primary object of this invention to avoid this inconvenience.

To this end, the present invention provides a ring adapted to protect a seal or packing of the type set forth hereinabove, which is characterized essentially in that it consists of a tubular portion mounted on the corresponding pin of the cross-pin member and on the external lateral wall of the bearing socket, and of an annular portion having its inner edge inserted between said shoulder and the packing of the pin.

However, in order to afford a clearer understanding of this invention and of the manner in which the same may be carried out in practice, reference will now be made to the accompanying drawing of which the single figure illustrates diagrammatically in fragmentary axial section a typical form of embodiment of the invention.

In this figure, a universal joint yoke 3 comprises a bearing socket 1 containing, for example, needles 2 disposed between this socket 1 and the corresponding pin 4 of a cross-pin member 5. A shaft packing or seal 6 consisting of a ring of flexible material such as a suitable elastomer is interposed in a manner already known per se between the edge 7 of socket 1 and a shoulder 8 formed on the pin 4. This seal or packing is of C-shaped configuration in radial section and bears with its back or inner periphery 9 against the pin 4 to seal the joint between this pin 4 and the socket 1, as shown.

The protection ring 10 according to this invention consists preferably of plastic material and comprises a tubular portion 11 having one end 12 formed with an inner bead engaging the pin 4 outside of said shoulder 8, the other end 14 being formed with bevelled sealing lips 15 engaging the registering portion of socket 1. The tubular portion 11 of protection ring 10 has an annular internal extension 13 disposed between said shoulder 8 and the packing 6, the space 16 left between the edge 7 of socket 1, the tubular portion 11, and the annular internal extension 13 being advantageously filled with a suitable lubricant.

The protection ring according to this invention will thus efficiently and reliably retain the lubricant in this space 16, while preventing the ingress of foreign matters likely to attain the rear part of the packing 6.

I claim:
1. A protection ring for protecting a shaft seal or packing fitted on a pin of a universal joint cross-pin member, between a shoulder of the corresponding pin and a bearing socket of said pin, said ring comprising a first tubular portion mounted on the relevant pin outside of said shoulder of said pin and a second tubular portion mounted on the external wall of said bearing socket, an intermediate annular portion integral with said first and second tubular portions, and a circular lip formed on said second tubular portions end engaging said external wall of said bearing socket.
2. A protection ring according to claim 1 further comprising an inner annular extension formed on said intermediate annular portion and inserted between said shoulder and said packing of said cross-pin member.

References Cited

UNITED STATES PATENTS

| | | | |
|---|---|---|---|
| 2,027,078 | 1/1936 | Warner | 64—17 |
| 2,773,366 | 12/1956 | Slaght | 64—17 |
| 2,773,368 | 12/1956 | Slaght | 64—17 |

FOREIGN PATENTS 1,001,170    8/1965    Great Britain.

HALL C. COE, Primary Examiner

U.S. Cl. X.R.
277—58